United States Patent Office 3,374,219
Patented Mar. 19, 1968

3,374,219
CHROMIUM - CONTAINING DYESTUFFS CONTAINING A MONOAZO AND A DI-AZO DYESTUFF
Walter Biedermann and Eginhard Steiner, Basel, Switzerland, assignors to J. R. Geigy A.G., Basel, Switzerland
No Drawing. Filed Dec. 16, 1964, Ser. No. 418,867
1 Claim. (Cl. 260—145)

ABSTRACT OF THE DISCLOSURE

The chromium-containing azo dyestuff, which in its free acid form has the formula

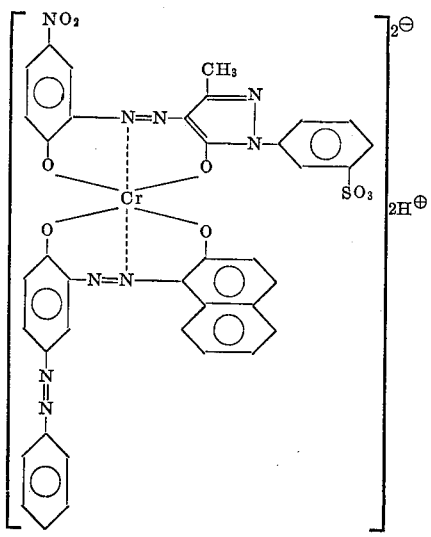

and dyes natural and synthetic polyamide fibers in brown shades of very good fastness properties.

---

The invention concerns a chromium-containing azo dyestuff which contains a mono and a disazo dyestuff bonded co-ordinatively to a hexavalent chromium atom. It also concerns a process for the production of this dyestuff and its use for the dyeing of natural and synthetic polyamide fiber materials such as wool, silk, leather, furs, nylons and the like, and also of super polyurethane fibers.

The novel dyestuff according to the invention is in its free acid form of the formula

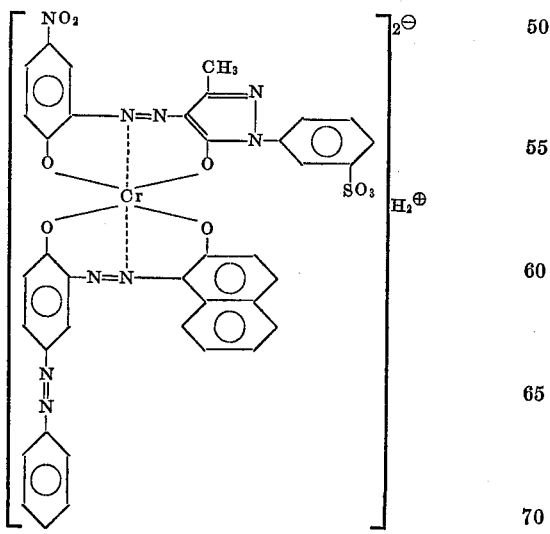

and dyes the aforementioned fiber materials in brown shades which have very good all-round fastness properties, especially wet fastness, fastness to perspiration, sea water, alkaline and acid milling, and to cross-dyeing especially of nylon/wool blended fabrics, from acetic acid-acidified dyebaths.

Very surprising is the superior light fastness of dyestuffs according to the invention, particularly when compared to that of structurally most closely related known dyestuffs.

The dyestuff according to the invention is prepared in the following manner:

36.8 parts of the disazo dyestuff from diazotized 3-amino-4-hydroxyazobenzene and 2-hydroxynaphthalene, 22.4 parts of formamide, and 250 parts of water are mixed with the amount of complex chromium compound of the type 1 chromium atom to 1 dyestuff molecule, corresponding to 5.2 parts of chromium and 41.9 parts of the dyestuff 4-nitro-2-amino-1-hydroxybenzene and 1-[3'-sulfophenyl]-3-methylpyrazolone. 10 parts of sodium hydroxide are added to this mixture which is then slowly heated to 90–95° and kept for 15 minutes at this temperature. The brown mass is then poured, while stirring well, into 200 parts of a 90–95°-hot 25%-sodium chloride solution. The precipitated dyestuff is filtered off and dried. It is a brown powder which dyes wool, silk, leather and synthetic polyamide in brown shades of high grade fastness.

We claim:
1. The chromium complex dyestuff which in its free acid form is of the formula

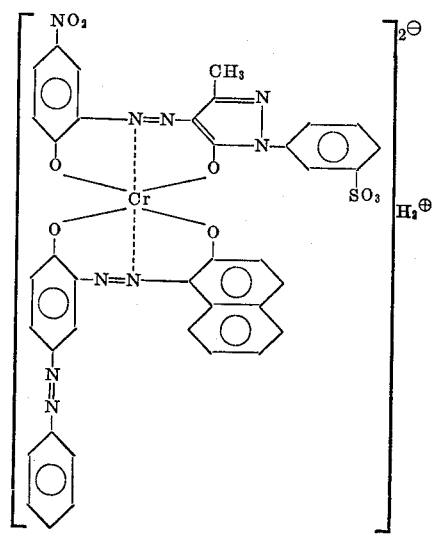

References Cited

UNITED STATES PATENTS 2,775,581  12/1956  Neier et al. _____ 261—145

FOREIGN PATENTS 220,140  2/1959  Australia.
342,307  12/1959  Switzerland.

FLOYD D. HIGEL, Primary Examiner.